US012682078B2

(12) United States Patent
Haimov et al.

(10) Patent No.: US 12,682,078 B2
(45) Date of Patent: Jul. 14, 2026

(54) SOFTWARE LIBRARY UPGRADES USING RISK ANALYSES

(71) Applicant: Dell Products L.P., Round Rock, TX (US)

(72) Inventors: Nisan Haimov, Beer Sheva (IL); Boris Shpilyuck, Ashdod (IL); Igor Dubrovsky, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/756,194

(22) Filed: Jun. 27, 2024

(65) Prior Publication Data

US 2026/0003972 A1     Jan. 1, 2026

(51) Int. Cl.
*G06F 21/57*          (2013.01)
*G06F 8/65*           (2018.01)

(52) U.S. Cl.
CPC .............. *G06F 21/577* (2013.01); *G06F 8/65* (2013.01); *G06F 2221/033* (2013.01)

(58) Field of Classification Search
CPC ..... G06F 21/577; G06F 8/65; G06F 2221/033
USPC ........................................................ 726/25
See application file for complete search history.

(56) References Cited

U.S. PATENT DOCUMENTS

| | | | | | |
|---|---|---|---|---|---|
| 8,555,273 | B1 * | 10/2013 | Chia | ........................ | G06F 8/654 |
| | | | | | 717/172 |
| 11,100,239 | B2 * | 8/2021 | Sun | ........................... | G06F 8/71 |

| | | | | | |
|---|---|---|---|---|---|
| 11,210,404 | B2 * | 12/2021 | Angelo | ................. | H04L 9/3239 |
| 11,422,917 | B2 * | 8/2022 | Magnezi | ............. | G06F 11/3696 |
| 11,481,498 | B2 * | 10/2022 | Velur | ..................... | G06F 21/577 |
| 11,546,218 | B1 * | 1/2023 | Glasco, Jr. | .............. | H04L 41/14 |
| 11,593,077 | B1 * | 2/2023 | Yu | ............................. | G06F 21/51 |
| 11,704,414 | B2 * | 7/2023 | Patel | ..................... | G06F 21/604 |
| | | | | | 726/25 |
| 12,086,269 | B2 * | 9/2024 | Kurian | ................. | G06F 21/577 |
| 12,131,140 | B2 * | 10/2024 | Nelson | ................. | G06F 21/577 |
| 12,229,256 | B2 * | 2/2025 | Arulmani | .............. | G06F 21/552 |
| 12,393,698 | B2 * | 8/2025 | Jordan | .................. | G06F 21/577 |
| 12,602,698 | B1 * | 4/2026 | Sobkowski | .......... | G06Q 30/018 |
| 2018/0097845 | A1 * | 4/2018 | Chen | ...................... | H04L 43/065 |
| 2020/0134184 | A1 * | 4/2020 | Bhatia | ........................ | G06F 8/65 |
| 2020/0242254 | A1 * | 7/2020 | Velur | ..................... | G06F 21/577 |
| 2023/0061121 | A1 * | 3/2023 | Tosevska | ............. | A61K 31/121 |

(Continued)

*Primary Examiner* — Tauqir Hussain

(74) *Attorney, Agent, or Firm* — WOMBLE BOND DICKINSON (US) LLP

(57)          ABSTRACT

Methods and systems for managing software libraries in a deployment are disclosed. The software libraries may be managed by using risk analyses to weigh a level of risk for an upgrade plan. The upgrade plan may be used to rectify a vulnerability in a software library of the software libraries. The risk analyses may include (i) performing a security scan of the software library to find the vulnerability; (ii) performing the security scan of available software libraries that have rectified the vulnerability; and (iii) defining parameters that weight risk with using the solution against the risk presented by the vulnerability. Based on the parameters, the software library may be upgraded. The risk analyses may further include testing functionality to ensure that functionality is maintained even if the software library is upgraded.

20 Claims, 6 Drawing Sheets

(56)                    References Cited

U.S. PATENT DOCUMENTS

| | | | |
|---|---|---|---|
| 2023/0097733 A1* | 3/2023 | Nelson | G06F 21/577 |
| | | | 726/25 |
| 2025/0124137 A1* | 4/2025 | Black | G06F 8/71 |
| 2025/0147755 A1* | 5/2025 | Muenzel | G06F 8/65 |
| 2025/0156531 A1* | 5/2025 | Seck | G06F 21/54 |
| 2025/0306891 A1* | 10/2025 | Filip | G06F 8/71 |

* cited by examiner

SOFTWARE LIBRARY UPGRADES USING RISK ANALYSES

FIELD

Embodiments disclosed herein relate generally to managing software libraries in a deployment. More particularly, embodiments disclosed herein relate to performing risk analyses for upgrading of the software libraries to maintain functionality.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
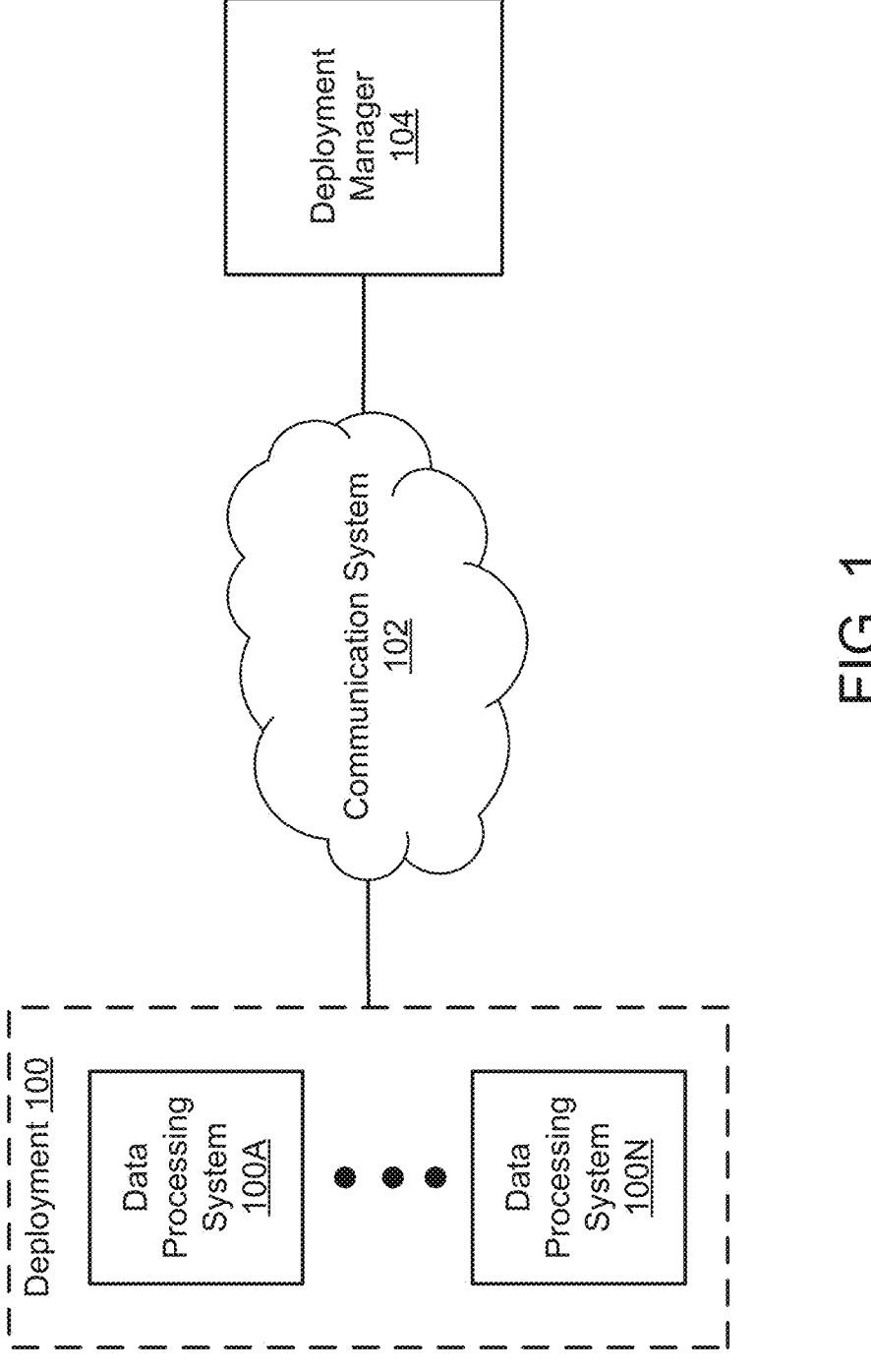
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing software libraries in a deployment. The software libraries may be managed by performing risk analyses for upgrading the software libraries to maintain functionality.

Performing the risk analyses may include (i) performing a security scan of a software library of the software libraries to find a vulnerability in the software library; (ii) performing the security scan of available versions of the software library to find a software library that has rectified the vulnerability; (iii) obtaining a solution that includes upgrading the software library to an upgraded software library of the available versions of the software library; and (iv) defining parameters that weight risk with using the solution against the risk presented by the vulnerability; and (v) using the solution, based on the parameters, to upgrade the software library to the upgraded software library. If the software library is upgraded to the upgraded software library, then (i) first tests may be performed on the software library; (ii) second tests may be performed on the upgraded software library; and (iii) results from the first tests and the second tests may be compared to ensure functionality between the software library and the upgraded software library is maintained.

In an embodiment, a method for managing software libraries in a deployment is disclosed. The method may include (i) identifying a vulnerability in a software library of the software libraries; (ii) based on the identifying of the vulnerability in the software library, obtaining a solution to rectify the vulnerability in the software library; (iii) making a first determination whether the risk with using the solution outweighs risk presented by the vulnerability in the software library; (iv) in a first instance of the first determination where the risk with using the solution does not outweigh the risk presented by the vulnerability in the software library: (a) upgrading, using the solution, the software library to obtain an upgraded software library; (b) deploying the upgraded software library to at least one data processing system of the deployment to obtain an upgraded deployment; and (c) providing computer implemented services using the upgraded deployment.

Obtaining the solution to rectify the vulnerability in the software library may include (i) performing a scan of a set of available versions of the software library; (ii) obtaining first vulnerabilities from the scan of the set of the available versions of the software library; and (iii) obtaining a plan, based on the first vulnerabilities, to upgrade the software library to a version of the software library of the set of the available versions of the software library.

The first determination may be made, at least in part, using parameters defined by an operator of the deployment, the parameters being used to weight the risk with using the solution against the risk presented by the vulnerability in the software library.

The parameters may define priorities for addressing vulnerabilities exhibited by the deployment based on severity levels reported by entities that identify the vulnerabilities.

The parameters may define a weight for the risk with using the solution based on a complexity level for using the solution in the deployment.

The weight may be based on, at least, numbers and types of modifications of other software hosted by the deployment to utilize the upgraded software library.

The method may further include, in a second instance of the first determination where the risk with using the solution outweighs the risk presented by the vulnerability in the software library: continuing to provide computer implemented services without performing the upgrade in the software library.

Identifying the risk with using the solution to rectify the vulnerability in the software library may include (i) obtaining a complexity level of the solution, the complexity level being based on numbers and types of modifications of the solution to the software library, the number and the types of the modifications affecting functionality of the software library; and (ii) obtaining the risk based on the complexity level of the solution.

The method may further include, before upgrading, using the solution, the software library to obtain the upgraded software library: obtaining, by performing first tests on the deployment, a pre-upgrade baseline of the software library.

The method may further include, before deploying the upgraded software library to the at least one data processing system of the deployment: (i) obtaining, by performing second tests on the upgraded software library, a post-upgrade baseline of the upgraded software library; performing a verification by comparing the pre-upgrade baseline to the post-upgrade baseline to ensure the post-upgrade baseline has a same functionality to the pre-upgrade baseline; and (iii) in an instance of the performing where the verification indicates that post-upgrade baseline has the same functionality to the pre-upgrade baseline: making a second determination to deploy the upgraded software library, wherein the deploying is performed based on the second determination to deploy the upgraded software library.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data processing systems may host software components such as applications. The software components may provide the computer implemented services.

During operation of the software components, the software components may utilize software libraries. The software libraries may be utilized by any number of software components.

However, if the software libraries exhibit vulnerabilities, the software components may also exhibit these same vulnerabilities by virtue of their use of the software libraries. If sufficiently severe, the vulnerabilities may (i) prevent, entirely or in part, desired computer implemented services from being provided, (ii) may cause computer implemented services to be provided in an undesirable manner (e.g., may expose sensitive data, may introduce errors, etc.), and/or may otherwise cause the data processing systems to operate in undesirable manners.

In general, embodiments disclosed here relate to systems and methods for managing software libraries in a deployment. A software library of the software libraries may be managed by (i) identifying a vulnerability in the software library and (ii) performing an upgrade plan to the software library, if risk in the upgrade plan does not outweigh risk due to the vulnerability.

The vulnerability may be identified by performing a security scan of the software library. The security scan may identify the vulnerability and assign a severity level to the vulnerability. The severity level may describe an impact of the vulnerability if exploited. For example, the vulnerability may permit a malicious entity access (i) to code within the software library, (ii) to an application that utilizes the software library, and/or (iii) to data that is used by the application.

To rectify the vulnerability, a solution may be obtained. The solution may be obtained by performing a security scan of available versions of the software library. From the available versions of the software library, a version of the software library may be selected that has addressed the vulnerability to use in an upgrade plan for the software library.

With the new version of the software library, a level of risk may be quantified in the upgrade plan. The level of the risk may be quantified by assessing a complexity level associated with upgrading the software library to the upgraded version of the software library. The complexity level may be based on any number and/or types of modifications to functionality in the software library. The modifications may be included in the upgrade plan and the modifications may rectify the vulnerability. However, the modifications may present the risk because any of the software components in a deployment may utilize the functionality, which may be altered by the modifications in the upgraded version of the software library. Alteration of the functionality may cause a deficiency in operation of the deployment.

Similarly, a level of risk may be quantified in not proceeding with the upgrade plan. Should the alteration in the functionality cause the deficiency in the operation, the level of the risk may be quantified by assessing functionality of the software library with the vulnerability in place.

To determine if, by the modifications, the risk in the solution outweighs the risk presented by the vulnerability, parameters may be set. The parameters may be set by an operator of the deployment. The parameters may weigh the risk with using the solution against the risk presented by the vulnerability in the software library. The parameters may define priorities for addressing the vulnerability based on the severity level obtained from the security scan. The parameters may also define a weight for the risk with using the solution based on a complexity level for using the solution. The weight may be based on any number and/or type of the modifications that affect the any number of the software components in the data processing system.

If the risk in the solution is found to outweigh the risk presented by the vulnerability, then the software library may not be upgraded, and computer implemented services may continue to be provided using the software library. However, if the risk in the solution is found to outweigh the risk presented in the vulnerability, then the software library may be upgraded to the upgraded version of the software library.

Before upgrading the software library to the new version of the software library, a pre-upgrade baseline may be obtained. The pre-upgrade baseline may be obtained by running first tests to record pre-upgrade functionality of the software library. After upgrading the software library to the upgraded software library, a post-upgrade assessment may be obtained by running second tests to record post-upgrade functionality of an upgraded software library.

A verification of the upgraded software library may be performed by comparing the pre-upgrade baseline to the post-upgrade assessment. By comparing the pre-upgrade baseline to the post-upgrade assessment, confirmation may be obtained that (i) the vulnerability has been rectified and (ii) the upgrade plan has been effective in addressing the vulnerability in the software library and maintaining an integrity of functionality between the software library and the upgraded software library.

To provide the above noted functionality, the system may include deployment 100 and deployment manager 104. Each of these components is discussed below.

Deployment 100 may include any number of data processing systems 100A-100N. Data processing systems 100A-100N may include software components such as applications. The software components may provide computer implemented services. During operation of the software components, software libraries may be utilized by any number and/or types of software components. A software library of the software libraries may exhibit a vulnerability. By virtue of utilizing the software library, a software component of the software components may exhibit the vulnerability as well.

Deployment manager 104 may manage the operation of deployment 100. To do so, deployment manager 104 may perform an upgrade plan to rectify the vulnerability that affects provision of computer implemented services by deployment 100. The upgrade plan may include (i) identifying the vulnerability, (ii) identifying a solution, and (iii) determining if the risk in the solution outweighs a risk presented by the vulnerability.

If the risk in the solution is determined to not outweigh the risk presented by the vulnerability, then deployment manager 104 may use the solution to rectify the vulnerability based. Further, deployment manager 104 may perform a comparison of functionality between the software library and an upgraded software library. The comparison may determine if (a) the vulnerability has been rectified and (b) the upgrade plan has been effective in addressing the vulnerability in the software library and maintaining an integrity of functionality between the software library and the upgraded software library.

However, if the risk in the solution is determined to outweigh the risk presented by the vulnerability, then deployment manager 104 may not upgrade the software library, and computer implemented services may continue to be provided using the software library.

While providing their functionality, any of deployment 100 and deployment manager 104 may perform all, or a portion, of the flows and methods shown in FIGS. 2A-3B.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
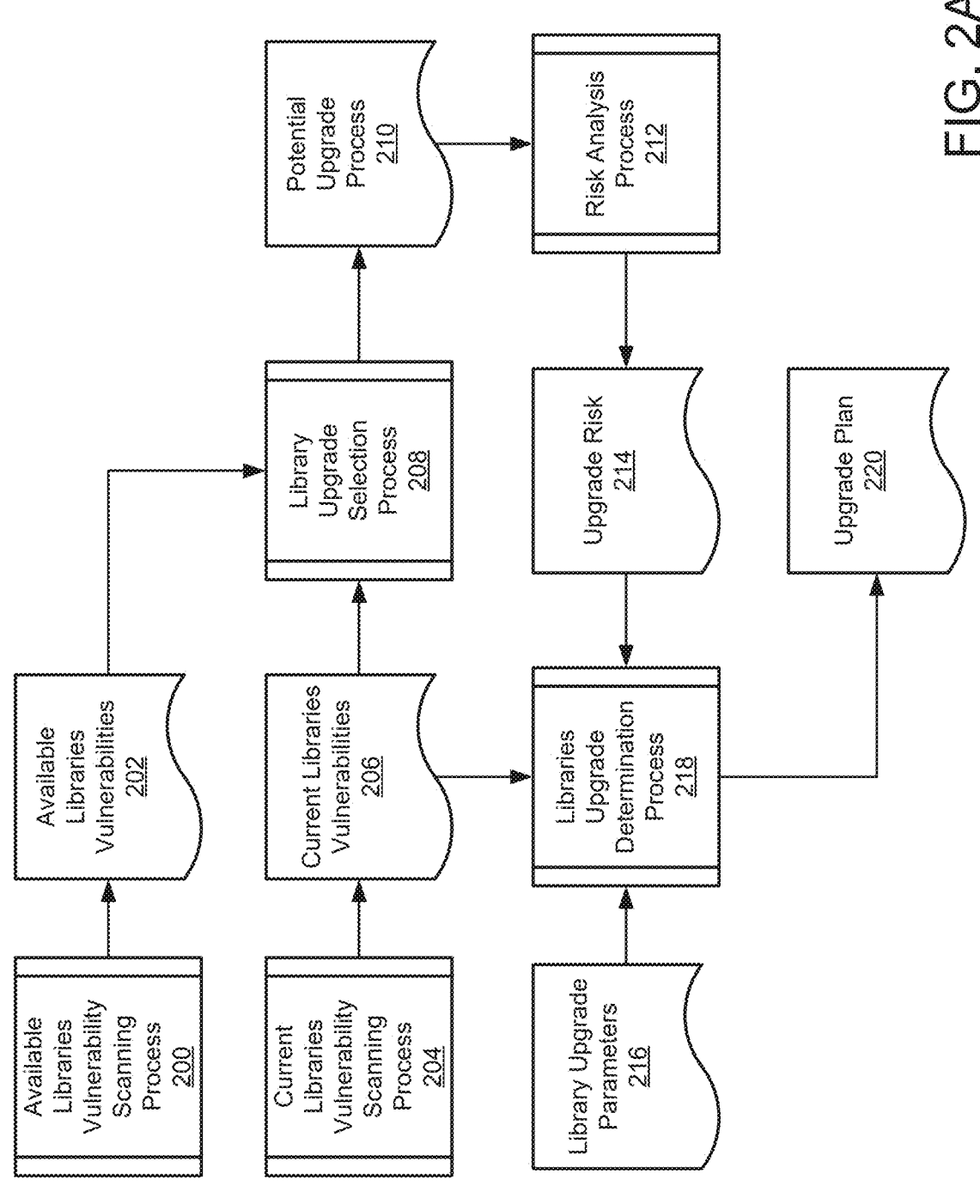
FIGS. 2A-2B show data flow diagrams illustrating operation of a system in accordance with an embodiment.
Figure 2B:
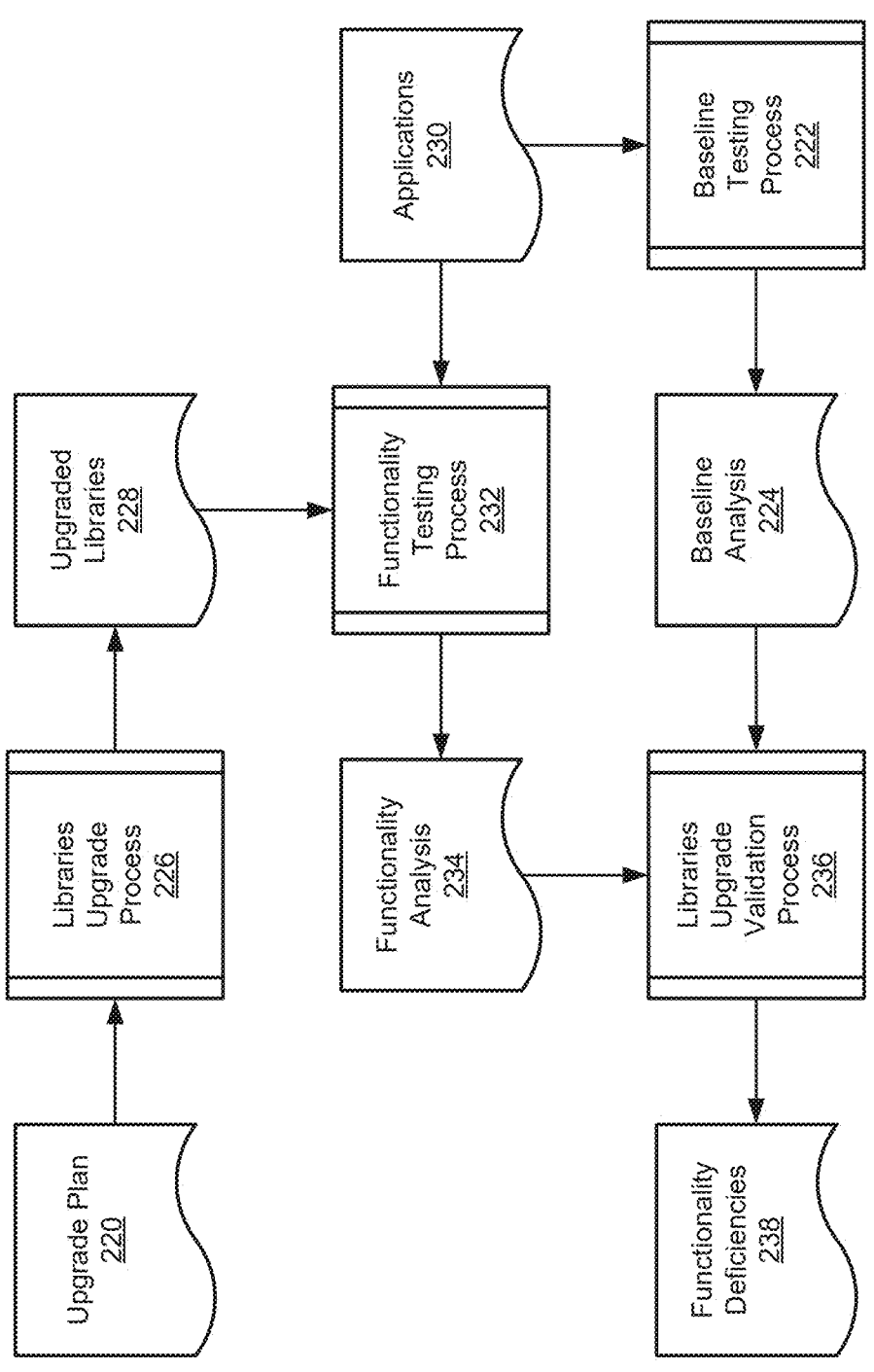

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 202, 206, etc.) is used to represent data structures, and a second set of shapes (e.g., 200, 204, etc.) is used to represent processes performed using and/or that generate data.

Turning to FIG. 2A, a first data flow diagram in accordance with an embodiment is shown. The first data flow diagram may illustrate data used in and data processing performed in generating an upgrade plan.

To generate the upgrade plan, current libraries vulnerability scanning process 204 may be performed. During current libraries vulnerability scanning process 204, vulnerabilities in a software library that is used by a deployment (e.g., deployment 100) and that may affect performance of the deployment may be determined. The vulnerabilities may be determined by performing a security scan. The security scan may include tracing code in the software library. The code may be traced by inspecting, in a line-by-line manner, the code. The code that may be inspected that include (i) inputs and/or types of first variables, (ii) operations using the input variables, (iii) outputs and/or the types of second variables, etc. The code may be inspected for bugs and security flaws.

Inspection of the code in the software library may yield current libraries vulnerabilities 206. Current libraries vulnerabilities 206 may include the bugs and/or the security flaws within a software library that is used by the deployment. The bugs and/or the security flaws may cause, at least, one vulnerability in the deployment.

In addition to current libraries vulnerability scanning process 204, available libraries vulnerability scanning process 200 may be performed. During available libraries vulnerability scanning process 200, vulnerabilities in any number of available versions of a software library that may, if used by the deployment, affect performance of the deployment may be determined. The vulnerabilities may be determined by performing a security scan of the available versions of the software library. The security scan may be performed by tracing code in the software library. The code may be traced by inspecting, in a line-by-line manner, the code. The code may be inspected that include (i) inputs and/or types of the first variables, (ii) operations using the input variables, and (iii) outputs and/or types of the second variables. The code may be inspected for bugs and security flaws.

Inspection of the code in the any number of the available software libraries may yield available libraries vulnerabilities 202. Available libraries vulnerabilities 202 may include the bugs and/or the security flaws within the any number of the available software libraries. The bugs and/or the security flaws may cause, at least, one vulnerability, if used in the deployment.

Using available libraries vulnerabilities 202 and current libraries vulnerabilities 206, library upgrade selection process 208 may be performed. During library upgrade selection process 208, a second version of the software library may be selected from available libraries vulnerabilities 202 and current libraries vulnerabilities 206. The second version of the software may be selected by deciding on the version of the software library that addresses a vulnerability in the deployment. The second version of the software library may be selected by an operator of the deployment and/or by an automated program. The second version of the software library may be considered to be an upgraded software library.

Selection of the upgraded software library may yield potential upgrade process 210. Potential upgrade process 210 may include the upgraded software library with which to upgrade a software library used in the deployment. To further consider risk of using the upgraded software library in the deployment, risk analysis process 212 may be performed.

During risk analysis process 212, a complexity level may be determined for code changes between a current version of the software library used by the deployment and the second version of the software library. The complexity level may be determined by enumerating and inspecting code changes between the software library and the upgraded software library. Enumeration of the code changes may yield a list of the code changes.

From the list of the code modifications, inspection of the code modifications may yield (i) a number of the code changes in the software library, (ii) at least one type of the code changes, and (iii) an effect by the code changes to other portions of the code. The quality of the code modifications may include modifications to mathematical expressions, variable types, inputs and outputs, etc. The inspection of the code modifications may yield a list of at least one deficiency in functionality of the upgraded software library.

The at least one deficiency may present risk, if the upgraded software library is used by the deployment. If the upgraded software library is used by the deployment, operation of the deployment may be impacted by the at least one deficiency in the functionality of the upgraded software library. The risk in using the upgraded software library may be upgrade risk 214.

In addition to upgrade risk 214, library upgrade parameters 216 may generated. Library upgrade parameters 216 may be generated by an operator of the deployment. Library upgrade parameters 216 may be generated by defining parameters. The parameters may be used to weight risk for upgrading to the new software library against the risk presented by the vulnerability in the current software library.

The parameters may include priorities for addressing vulnerabilities exhibited by the deployment based on severity levels reported by security scans of the software library and the available versions of the software library. The parameters may also define a weight for the risk based on a complexity level for upgrading to the new software library in the deployment. The weight may be based on, at least, numbers and/or types of modifications of other software hosted by the deployment to utilize the new software library.

To develop an upgrade plan, library upgrade parameters 216 and upgrade risk 214 may be ingested by libraries upgrade determination process 218. During libraries upgrade determination process 218, library upgrade parameters 216 may be used with upgrade risk 214. The parameters may be used by weighting the risk for upgrading to the upgraded software library in the deployment. The risk for using the upgraded software library in the deployment may include modifications that affect the other software hosted by the deployment. By affecting the other software, operation of the deployment may be impacted.

From libraries upgrade determination process 218, upgrade plan 220 may be generated. Upgrade plan 220 may include a decision whether to upgrade the software library in the deployment to the upgraded software library.

Thus, via the data flow illustrated in FIG. 2A, a system in accordance with an embodiment may generate an upgrade plan. By generating the upgrade plan, the deployment may improve a provision of computer implemented services.

Turning to FIG. 2B, a second data flow diagram in accordance with an embodiment is shown. The second data flow diagram may illustrate data used in and data processing performed in upgrading the software library and validating the upgraded software library in the deployment.

To upgrade the software library and validate the upgrade in the deployment, libraries upgrade process 226 may be performed. During libraries upgrade process 226, upgrade plan 220 may be ingested. After ingesting upgrade plan 220, a decision to upgrade the software library to the upgraded software library in the deployment may be read.

After reading the decision, the software library may be upgraded to the upgraded software library. The software library may be upgraded by making modifications to code in the software library in the deployment to generate the upgraded software library. As a result of the modifications, upgraded libraries 228 may be generated. Upgraded libraries 228 may include the code of the second software library in the deployment.

Before upgrading the software library in the deployment to the upgraded software library, baseline testing process 222 may be performing. During baseline testing process 222, first tests may be performed by the deployment. The first tests may be performed by running the first tests on applications 230. Applications 230 may include software components in the deployment. The software components may utilize the software library before being upgraded in libraries upgrade process 226.

The first tests may utilize applications 230 to generate first tests results. The first tests results may include the vulnerability produced by the software library in the deployment. The first tests results may yield baseline analysis 224. Baseline analysis 224 may record a first performance evaluation of the deployment utilizing the software library before libraries upgrade process 226 is performed. The first performance evaluation may be recorded by enumerating the first tests results in a first list along with at least one explanation of the first tests results.

After libraries upgrade process 226 is performed and upgraded libraries 228 is generated, functionality testing process 232 may be performed. During functionality testing process 232, second tests may be performed by the deployment using the upgraded software library. The second tests may be performed by running the set of the second tests on applications 230 in the deployment. The second tests results may yield functionality analysis 234. Functionality analysis 234 may include a second performance evaluation of the deployment utilizing the upgraded software library after libraries upgrade process 226 is performed. The second performance evaluation may include an enumeration of the second tests results in a second list along with at least one explanation of the second tests results.

For example, a deployment may use a software library. The software library may include functionality. The functionality may include read functions for extensible markup language files (xml). The read functions may parse attributes and read the values for each of the attributes. Upon upgrading the software library, the read functions may be altered so that attributes are no longer parsed and the values for each of the attributes are no longer read. As a result of upgrading the software library, a deficiency may be present in the functionality of software library.

After baseline analysis 224 and functionality analysis 234 are generated, libraries upgrade validation process 236 may be performed. During libraries upgrade validation process 236, a comparison of results between baseline analysis 224 and functionality analysis 234 may be performed. The comparison may be performed by juxtaposing results from baseline analysis 224 and functionality analysis 234.

For example, during baseline testing process 222, the first tests may be performed. Also, during functionality testing process 232, the second tests may be performed. The first tests may generate the first test results. Likewise, the second tests may generate second test results.

The first test results may indicate a presence of the vulnerability in the software library in addition to matching expected first test results. In addition, the second test results may not indicate the presence of the vulnerability because the upgraded software library rectified the vulnerability. However, the second test results may not match expected second test results. Because the second tests results did not match the expected second test results, the upgraded software library may include a deficiency in functionality. To be free of a deficiency in functionality, the second tests results may match the expected second test results.

The deficiency may be recorded in functionality deficiencies 238. Functionality deficiencies 238 may be determined in libraries upgrade validation process 236 by comparing juxtaposing the results from baseline analysis 224 and functionality analysis 234. Upon juxtaposing the results, functionality deficiencies 238 may be determined by tracing code in the software library and the second software library and finding a difference in the code that led to difference in the results. The difference in the code may be indicated in functionality deficiencies 238.

Thus, via the data flow illustrated in FIG. 2B, a system in accordance with an embodiment may upgrade the software library and validate the upgrade plan in the deployment. By upgrading the software library and validating the upgrade plan, the deployment may improve a provision of computer implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
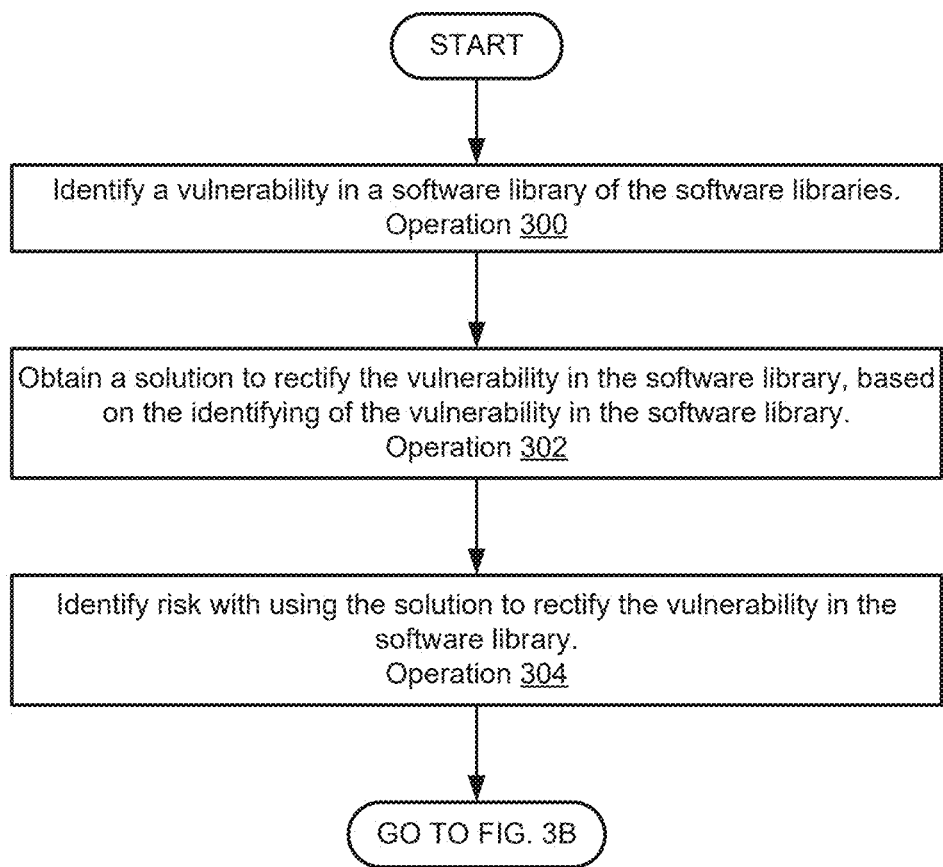
FIGS. 3A-3B show flow diagrams illustrating a method in accordance with an embodiment.
Figure 3B:
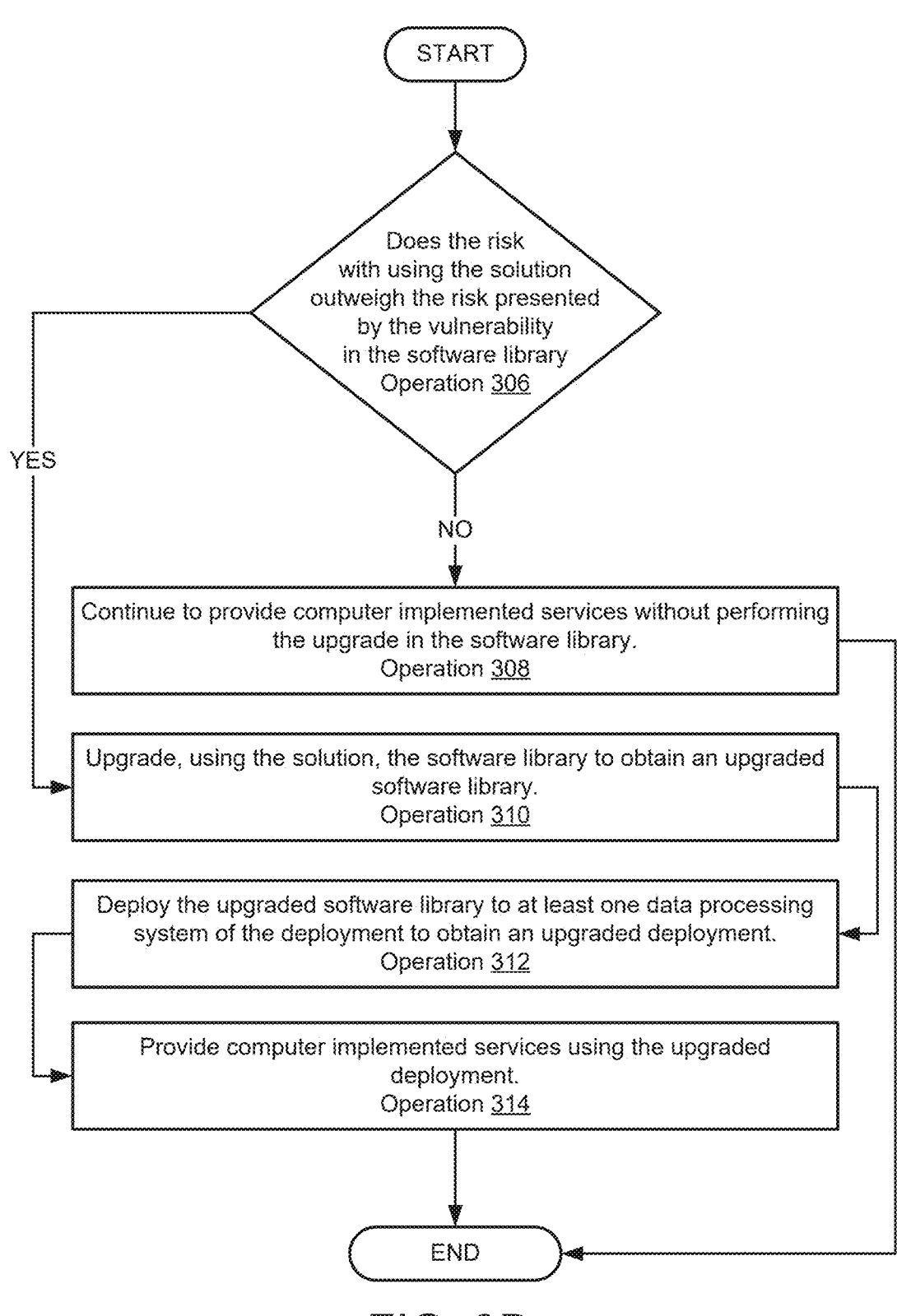

As discussed above, the components of FIG. 1 may perform various methods to manage power consumption by data processing systems. FIGS. 3A-3B illustrate a method that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing software libraries in a deployment in accordance with an embodiment is shown. The method may be performed, for example, by any of the components of the system of FIG. 1, and/or other components not shown therein.

At operation 300, a vulnerability may be identified in a software library of the software libraries. The vulnerability may be identified by performing a security scan of the software library.

At operation 302, a solution may be obtained to rectify the vulnerability in the software library, based on the identifying of the vulnerability in the software library. The solution may be identified by (i) performing a security scan of available versions of the software library; (ii) obtaining first vulnerabilities from the security scan of the available versions of the software library; and (iii) obtaining a plan, based on the first vulnerabilities, to upgrade the software library to a version of the software library the available versions of the software library.

The security scan of the available versions of the software library may be performed by tracing, in a line-by-line manner, code in each version of the software library of the available versions of the software library. Tracing the code may include performing tests with the code within each version of the software library to check for errors and vulnerabilities in operation. The first vulnerabilities may be obtained by completing the security scan of the available versions of the software libraries and obtaining an evaluation of the code from within each version of the software library. The plan to upgrade the software library may be obtained by selecting a version of the software library of the available versions of the software libraries that has rectified the vulnerability. By having rectified the vulnerability, the version of the software library may not have the vulnerability included within the first vulnerabilities.

At operation 304, risk may be identified with using the solution to rectify the vulnerability in the software library. The risk may be identified by (i) obtaining a complexity level of the solution, the complexity level being based on numbers and/or types of modifications of the solution to the software library, the number and/or the types of the modifications impacting functionality of the software library; and (ii) obtaining the risk based on the complexity level of the solution.

The complexity level may be obtained by evaluating the numbers and/or the types of the modifications in the version of the software library, the modifications that will be used to upgrade the software library. The risk may be obtained by evaluating an impact of the complexity level in a deployment. The impact may be minimal in which operations may not be disrupted in other software in the deployment. On the other hand, the effect may be significant in which functionality may be impacted and compatibility issues can occur in the deployment.

Turning to FIG. 3B, at operation 306, a determination may be made regarding whether the risk with using the solution outweighs the risk presented by the vulnerability in the software library. The determination may be made by using parameters defined by an operator of the deployment. The parameters may be used to weigh the risk with using the solution against the risk presented by the vulnerability in the software. The parameters may define priorities for addressing vulnerabilities exhibited by the deployment based on severity levels reported by entities that identify the vulnerabilities. The parameters may define a weight for the risk with using the solution based on a complexity level for using the solution in the deployment.

If the risk with using the solution does not outweigh the risk presented by the vulnerability in the software library, the method may continue at operation 310. However, if the risk with using the solution outweighs the risk presented by the vulnerability in the software library, then the method may continue at operation 308.

At operation 308, computer implemented services may continue to be provided without performing the upgrade in the software library. The computer implemented services may continue to be provided by performing operations using the software library by the deployment.

At operation 310, the software library may be upgraded using the solution to obtain an upgraded software library. The software library may be upgraded by performing modifications in code of the software library to produce the upgraded software library. The modifications may make the code of the software library match the code of the version of the software library selected from the available versions of the software library described in operation 302.

In addition, before upgrading, using the solution, the software library to obtain the upgraded software library, a pre-upgraded baseline may be obtained by performing first tests on the deployment. The first tests may be performed by running the first tests on the deployment and operating with code in the deployment that uses the software library.

At operation 312, the upgraded software library may be deployed to at least one data processing system of the deployment to obtain an upgraded deployment. The upgraded software library may be deployed by replacing the software library with the upgraded software library in the at least one data processing system.

In addition, before deploying the upgraded software library to the at least one data processing system of the deployment, a post-upgraded baseline may be obtained by performing second tests on the deployment and a verification may be performed by comparing the pre-upgrade baseline. The verification may be performed to ensure that the post-upgrade baseline has a same functionality to the pre-upgrade baseline.

The second tests may be performed by running the second tests on the deployment and operating with the code in the deployment that uses the upgraded software library. The verification may be performed by (i) comparing first output of the first tests to first expected output and (ii) comparing second output of the second tests to second expected output. Comparing the first output to the first expected output may indicate (i) an expected functionality of the software library and (ii) a presence of the vulnerability in the software library. Likewise, comparing the second output to the second expected output may also indicate (i) an expected functionality of the upgraded software library and (ii) a lack of the presence of the vulnerability in the upgraded software library. However, if (i) the first output matches the first expected output and (ii) the second output does not match the second expected output, then a deficiency in functionality of the upgraded software library may be present.

In an instance of the performing where the verification indicates that post-upgrade baseline has the same functionality to the pre-upgrade baseline, a second determination may be made to deploy the upgraded software library, wherein the deploying is performed based on the second determination to deploy the upgraded software library. The second determination may be made by concluding that the same functionality exists in the software library and the upgraded software library.

At operation 314, the computer implemented services may be provided by using the upgraded deployment. The computer implemented services may be provided by performing operations using the upgraded software library by the deployment.

Thus, via the method shown in FIGS. 3A-3B, embodiments herein may likely improve a likelihood of assessing risk in upgrading a software library. By improving the likelihood that of assessing risk in upgrading a software library, the data processing systems may be more likely to provide desirable computer implemented services by, for example, rectifying a vulnerability in a software library, ensuring functionality is maintained before and after an upgrade of the software library, etc.

Figure 4:
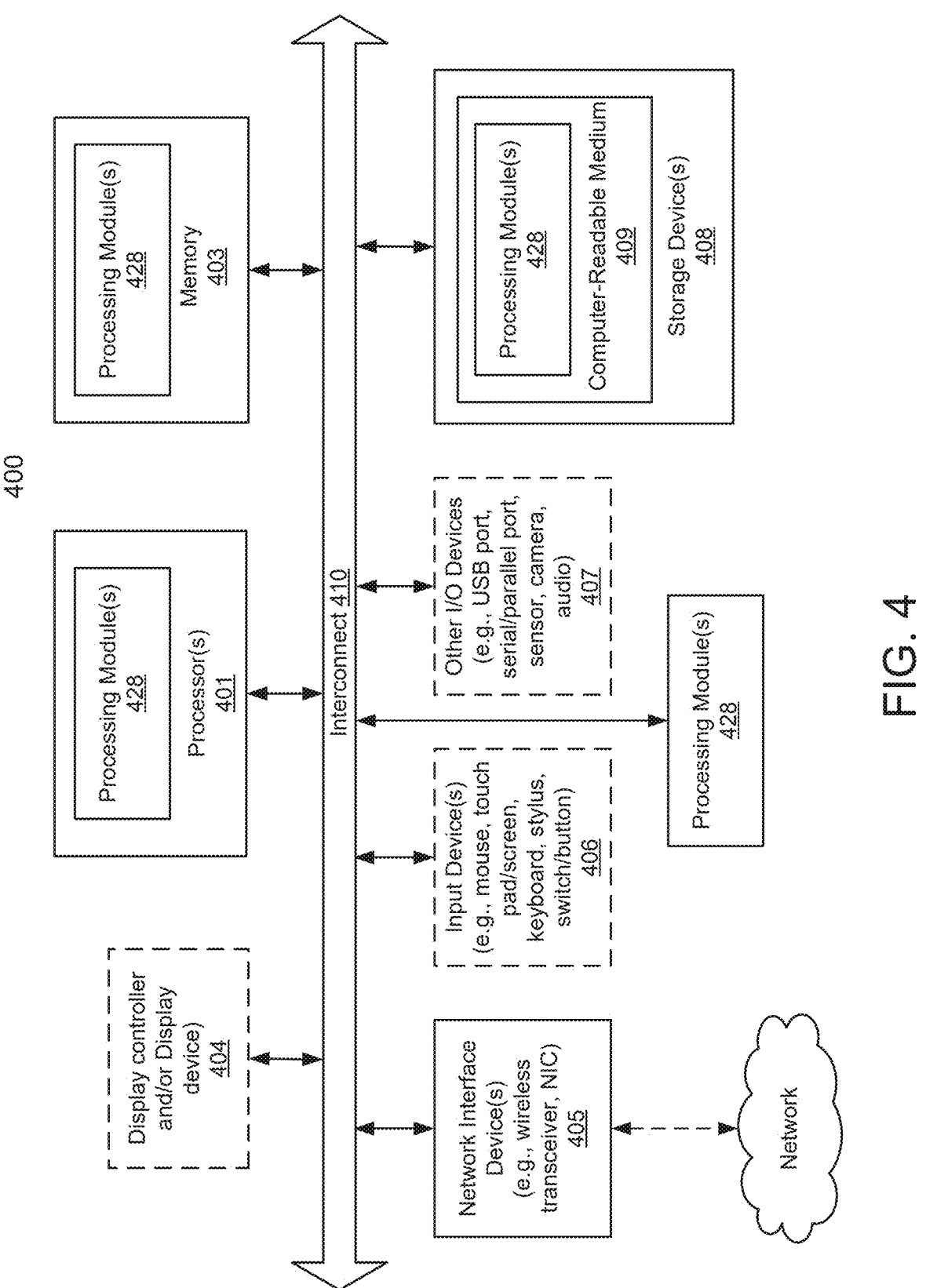
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing software libraries in a deployment, the method comprising:

identifying a vulnerability in a software library of the software libraries;

based on the identifying of the vulnerability in the software library:

obtaining a solution to rectify the vulnerability in the software library;

identifying risk with using the solution to rectify the vulnerability in the software library;

making a first determination regarding whether the risk with using the solution outweighs a risk presented by the vulnerability in the software library, wherein the first determination is made, at least in part, using parameters defined by an operator of the deployment, the parameters being used to weight the risk with using the solution against the risk presented by the vulnerability in the software library, and the parameters define priorities for addressing vulnerabilities exhibited by the deployment based on severity levels reported by entities that identify the vulnerabilities; and in a first instance of the first determination where the risk with using the solution does not outweigh the risk presented by the vulnerability in the software library:

upgrading, using the solution, the software library to obtain an upgraded software library;

deploying the upgraded software library to at least one data processing system of the deployment to obtain an upgraded deployment; and providing computer implemented services using the upgraded deployment.

2. The method of claim 1, wherein obtaining the solution to rectify the vulnerability in the software library comprises:

performing a scan of a set of available versions of the software library;

obtaining first vulnerabilities from the scan of the set of the available versions of the software library; and obtaining a plan, based on the first vulnerabilities, to upgrade the software library to a version of the software library of the set of the available versions of the software library.

3. The method of claim 1, wherein the severity levels correspond to levels of access including access to code within the software library, access to an application that utilizes the software library, and access to data used by the application.

4. The method of claim 1, wherein the parameters further define a weight for the risk with using the solution based on a complexity level for using the solution in the deployment.

5. The method of claim 4, wherein the weight is based on, at least, numbers and types of modifications of other software hosted by the deployment to utilize the upgraded software library.

6. The method of claim 1, further comprising:

in a second instance of the first determination where the risk with using the solution outweighs the risk presented by the vulnerability in the software library:

continuing to provide computer implemented services without performing the upgrade in the software library.

7. The method of claim 1, wherein identifying the risk with using the solution to rectify the vulnerability in the software library comprises:

obtaining a complexity level of the solution, the complexity level being based on numbers and types of modifications of the solution to the software library, the number and the types of the modifications affecting functionality of the software library; and obtaining the risk based on the complexity level of the solution.

8. The method of claim 1, further comprising:

before upgrading, using the solution, the software library to obtain the upgraded software library:

obtaining, by performing first tests on the deployment, a pre-upgrade baseline of the software library.

9. The method of claim 8, further comprising:

before deploying the upgraded software library to the at least one data processing system of the deployment:

obtaining, by performing second tests on the upgraded software library, a post-upgrade baseline of the upgraded software library;

performing a verification by comparing the pre-upgrade baseline to the post-upgrade baseline to ensure the post-upgrade baseline has a same functionality to the pre-upgrade baseline; and in an instance of the performing where the verification indicates that post-upgrade baseline has the same functionality to the pre-upgrade baseline:

making a second determination to deploy the upgraded software library, wherein the deploying is performed based on the second determination to deploy the upgraded software library.

10. A non-transitory machine-readable medium having instructions stored therein, which when executed by a processor, cause the processor to perform operations for managing software libraries in a deployment, the operations comprising:

identifying a vulnerability in a software library of the software libraries;

based on the identifying of the vulnerability in the software library:

obtaining a solution to rectify the vulnerability in the software library;

identifying risk with using the solution to rectify the vulnerability in the software library;

making a first determination whether the risk with using the solution outweighs a risk presented by the vulnerability in the software library, wherein the first determination is made, at least in part, using parameters defined by an operator of the deployment, the parameters being used to weight the risk with using the solution against the risk presented by the vulnerability in the software library, and the parameters define priorities for addressing vulnerabilities exhibited by the deployment based on severity levels reported by entities that identify the vulnerabilities; and in a first instance of the first determination where the risk with using the solution does not outweigh the risk presented by the vulnerability in the software library:

upgrading, using the solution, the software library to obtain an upgraded software library;

deploying the upgraded software library to at least one data processing system of the deployment to obtain an upgraded deployment; and providing computer implemented services using the upgraded deployment.

11. The non-transitory machine-readable medium of claim 10, wherein obtaining the solution to rectify the vulnerability in the software library comprises:

performing a scan of a set of available versions of the software library;

obtaining first vulnerabilities from the scan of the set of the available versions of the software library; and obtaining a plan, based on the first vulnerabilities, to upgrade the software library to a version of the software library of the set of the available versions of the software library.

12. The non-transitory machine-readable medium of claim 10, wherein the severity levels correspond to levels of access including access to code within the software library, access to an application that utilizes the software library, and access to data used by the application.

13. The non-transitory machine-readable medium of claim 10, wherein the parameters further define a weight for the risk with using the solution based on a complexity level for using the solution in the deployment.

14. A data processing system, comprising:

a processor; and a memory coupled to the processor to store instructions, which when executed by the processor, cause the processor to perform operations managing software libraries in a deployment, the operations comprising:

identifying a vulnerability in a software library of the software libraries;

based on the identifying of the vulnerability in the software library:

obtaining a solution to rectify the vulnerability in the software library;

identifying risk with using the solution to rectify the vulnerability in the software library;

making a first determination whether the risk with using the solution outweighs a risk presented by the vulnerability in the software library, wherein the first determination is made, at least in part, using parameters defined by an operator of the deployment, the parameters being used to weight the risk with using the solution against the risk presented by the vulnerability in the software library, and the parameters define priorities for addressing vulnerabilities exhibited by the deployment based on severity levels reported by entities that identify the vulnerabilities; and in a first instance of the first determination where the risk with using the solution does not outweigh the risk presented by the vulnerability in the software library:

upgrading, using the solution, the software library to obtain an upgraded software library;

deploying the upgraded software library to at least one data processing system of the deployment to obtain an upgraded deployment; and providing computer implemented services using the upgraded deployment.

15. The data processing system of claim 14, wherein obtaining the solution to rectify the vulnerability in the software library comprises:

performing a scan of a set of available versions of the software library;

obtaining first vulnerabilities from the scan of the set of the available versions of the software library; and obtaining a plan, based on the first vulnerabilities, to upgrade the software library to a version of the software library of the set of the available versions of the software library.

16. The data processing system of claim 14, wherein the severity levels correspond to levels of access including access to code within the software library, access to an application that utilizes the software library, and access to data used by the application.

17. The data processing system of claim 14, wherein the parameters further define a weight for the risk with using the solution based on a complexity level for using the solution in the deployment.

18. The non-transitory machine-readable medium of claim 13, wherein the weight is based on, at least, numbers and types of modifications of other software hosted by the deployment to utilize the upgraded software library.

19. The non-transitory machine-readable medium of claim 10, further comprising:

in a second instance of the first determination where the risk with using the solution outweighs the risk presented by the vulnerability in the software library:

continuing to provide computer implemented services without performing the upgrade in the software library.

20. The data processing system of claim 17, wherein the weight is based on, at least, numbers and types of modifications of other software hosted by the deployment to utilize the upgraded software library.

* * * * *